US012812168B2

(12) United States Patent
Zhao et al.

(10) Patent No.: US 12,812,168 B2
(45) Date of Patent: Nov. 24, 2026

(54) BOUNDARY FILTERING FOR INTRABC AND INTRATMP MODES

(71) Applicant: TENCENT AMERICA LLC, Palo Alto, CA (US)

(72) Inventors: Xin Zhao, San Jose, CA (US); Guichun Li, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 61 days.

(21) Appl. No.: 18/913,339

(22) Filed: Oct. 11, 2024

(65) Prior Publication Data

US 2025/0039443 A1 Jan. 30, 2025

Related U.S. Application Data

(63) Continuation of application No. 17/980,316, filed on Nov. 3, 2022, now Pat. No. 12,120,346.

(Continued)

(51) Int. Cl.

*H04N 19/11* (2014.01)
*H04N 19/105* (2014.01)

(Continued)

(52) U.S. Cl.

CPC ......... *H04N 19/593* (2014.11); *H04N 19/105* (2014.11); *H04N 19/11* (2014.11);

(Continued)

(58) Field of Classification Search

CPC .... H04N 19/593; H04N 19/105; H04N 19/11; H04N 19/117; H04N 19/132;

(Continued)

(56) References Cited

U.S. PATENT DOCUMENTS

| | | | |
|---|---|---|---|
| 11,290,736 | B1 | 3/2022 | Wang et al. |
| 2019/0166370 | A1 | 5/2019 | Xiu et al. |

(Continued)

FOREIGN PATENT DOCUMENTS

| | | | |
|---|---|---|---|
| CN | 113396590 | A | 9/2021 |
| WO | 2017030200 | A1 | 2/2017 |

(Continued)

OTHER PUBLICATIONS

Kui Fan et al., "Efficient Prediction Methods With Enhanced Spatial-Temporal Correlation for HEVC", IEEE Transactions on Circuits and Systems for Video Technology, 2019, vol. 29, No. 12, pp. 3716-3728 (13 pages).

(Continued)

*Primary Examiner* — Nguyen T Truong

(74) *Attorney, Agent, or Firm* — Sughrue Mion, PLLC

(57) ABSTRACT

A method includes receiving a coded video bitstream that includes a current picture with at least one block located at a boundary of the current picture and coded in accordance with an intra template matching (intraTMP) mode; determining boundary filtering is enabled for the at least one block based on a syntax element in the received coded video stream; filtering one or more boundary samples corresponding to the at least one block to generate one or more filtered samples; and decoding the at least one block based on the generated one or more filtered samples.

20 Claims, 14 Drawing Sheets

Related U.S. Application Data

(60) Provisional application No. 63/388,983, filed on Jul. 13, 2022.

(51) Int. Cl.

| | |
|---|---|
| ***H04N 19/117*** | (2014.01) |
| ***H04N 19/132*** | (2014.01) |
| ***H04N 19/159*** | (2014.01) |
| ***H04N 19/167*** | (2014.01) |
| ***H04N 19/172*** | (2014.01) |
| ***H04N 19/176*** | (2014.01) |
| ***H04N 19/593*** | (2014.01) |
| ***H04N 19/70*** | (2014.01) |
| ***H04N 19/80*** | (2014.01) |

(52) U.S. Cl.
CPC ......... *H04N 19/117* (2014.11); *H04N 19/132* (2014.11); *H04N 19/159* (2014.11); *H04N 19/167* (2014.11); *H04N 19/172* (2014.11); *H04N 19/176* (2014.11); *H04N 19/70* (2014.11); *H04N 19/80* (2014.11)

(58) Field of Classification Search
CPC .. H04N 19/159; H04N 19/167; H04N 19/172; H04N 19/176; H04N 19/70; H04N 19/80
USPC ..................................................... 375/240.12
See application file for complete search history.

(56) References Cited

U.S. PATENT DOCUMENTS

| | | | |
|---|---|---|---|
| 2019/0306498 | A1 | 10/2019 | Zhao et al. |
| 2020/0084454 | A1 | 3/2020 | Liu et al. |
| 2020/0366900 | A1 | 11/2020 | Jun et al. |
| 2021/0344931 | A1 | 11/2021 | Filippov et al. |
| 2021/0368170 | A1 | 11/2021 | Sarwer et al. |
| 2022/0094962 | A1 | 3/2022 | Choi et al. |
| 2022/0210475 | A1 | 6/2022 | Goswami et al. |

FOREIGN PATENT DOCUMENTS

| | | | |
|---|---|---|---|
| WO | 2020238838 | A1 | 12/2020 |
| WO | 2022063729 | A1 | 3/2022 |

OTHER PUBLICATIONS

International Search Report dated Apr. 6, 2023, issued in International Application No. PCT/US2022/049229.
Written Opinion dated Apr. 6, 2023, issued in International Application No. PCT/US2022/049229.
U.S. Appl. No. 17/980,316, filed Nov. 3, 2022.
U.S. Appl. No. 63/388,983, filed Jul. 13, 2022.
Communication from the Japanese Patent Office dated Sep. 1, 2026 in Application No. JP 2024-515304.
European Search Report dated Jul. 28, 2026 in EP Application No. 22951337.9.

203

BOUNDARY FILTERING FOR INTRABC AND INTRATMP MODES

CROSS-REFERENCE TO RELATED APPLICATION(S)

This application is a Continuation application of U.S. application Ser. No. 17/980,316, filed on Nov. 3, 2022, which is based on and claims priority to U.S. Provisional Patent Application No. 63/388,983, filed on Jul. 13, 2022, the disclosure of which is incorporated by reference herein in its entirety.

TECHNICAL FIELD

The present disclosure relates generally to communication systems, and more particularly to methods and apparatuses for boundary filtering for intra block copy (IBC) and intra template matching prediction (intraTMP) mode.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC, and the new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1). The ECM (Enhanced Compression Model) software is developed under coordinated exploration study by the Joint Video Exploration Team (JVET) of ITU-T VCEG and ISO/IEC MPEG as potential enhanced video coding technology beyond the capabilities of VVC. The current coding standards for intra block copy (IBC) and intra template matching prediction modes do not adequately account for block discontinuities at prediction block boundaries.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for boundary filtering for intra block copy (IBC) and intra template matching prediction (intraTMP) mode are disclosed by the present disclosure.

According to an exemplary embodiment, a method performed by at least one processor in a video decoder includes receiving a coded video bitstream that includes a current picture with at least one block located at a boundary of the current picture and coded in accordance with one of (i) an intra block copy (IBC) mode, (ii) an intra template matching (intraTMP) mode, and (iii) an IBC merge mode. The method further includes determining whether boundary filtering is enabled for the at least one block based on a syntax element in the received coded video stream. The method further includes based on a determination that the boundary filtering is enabled: filtering one or more boundary samples corresponding to the at least one block to generate one or more filtered samples, and decoding the at least one block based on the generated one or more filtered samples. The method further includes based on a determination that the boundary filtering is not enabled, decoding the at least one block without filtering the one or more boundary samples.

According to an exemplary embodiment, a video decoder includes at least one memory configured to store computer program code, and at least one processor configured to access the computer program code and operate as instructed by the computer program code. The computer program code includes receiving code configured to cause the at least one processor to receive a coded video bitstream that includes a current picture with at least one block located at a boundary of the current picture and coded in accordance with one of (i) an intra block copy (IBC) mode, (ii) an intra template matching (intraTMP) mode, and (iii) an IBC merge mode. The computer program code includes determining code configured to cause the at least one processor to determine whether boundary filtering is enabled for the at least one block based on a syntax element in the received coded video stream. The computer program code further includes filtering code, and determining code. Based on a determination that the boundary filtering is enabled: the filtering code is configured to cause the at least one processor to filter one or more boundary samples corresponding to the at least one block to generate one or more filtered samples, and the decoding code is configured to cause the at least one processor to decode the at least one block based on the generated one or more filtered samples. Based on a determination that the boundary filtering is not enabled, the decoding code is configured to cause the at least one processor to decode the at least one block without filtering the one or more boundary samples.

According to an exemplary embodiment, a non-transitory computer readable medium having instructions stored therein, which when executed by a processor in a video decoder cause the processor to execute a method including receiving a coded video bitstream that includes a current picture with at least one block located at a boundary of the current picture and coded in accordance with one of (i) an intra block copy (IBC) mode, (ii) an intra template matching (intraTMP) mode, and (iii) an IBC merge mode. The method further includes determining whether boundary filtering is enabled for the at least one block based on a syntax element in the received coded video stream. The method further includes, based on a determination that the boundary filtering is enabled: filtering one or more boundary samples corresponding to the at least one block to generate one or more filtered samples, and decoding the at least one block based on the generated one or more filtered samples. The method further includes, based on a determination that the boundary filtering is not enabled, decoding the at least one block without filtering the one or more boundary samples.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
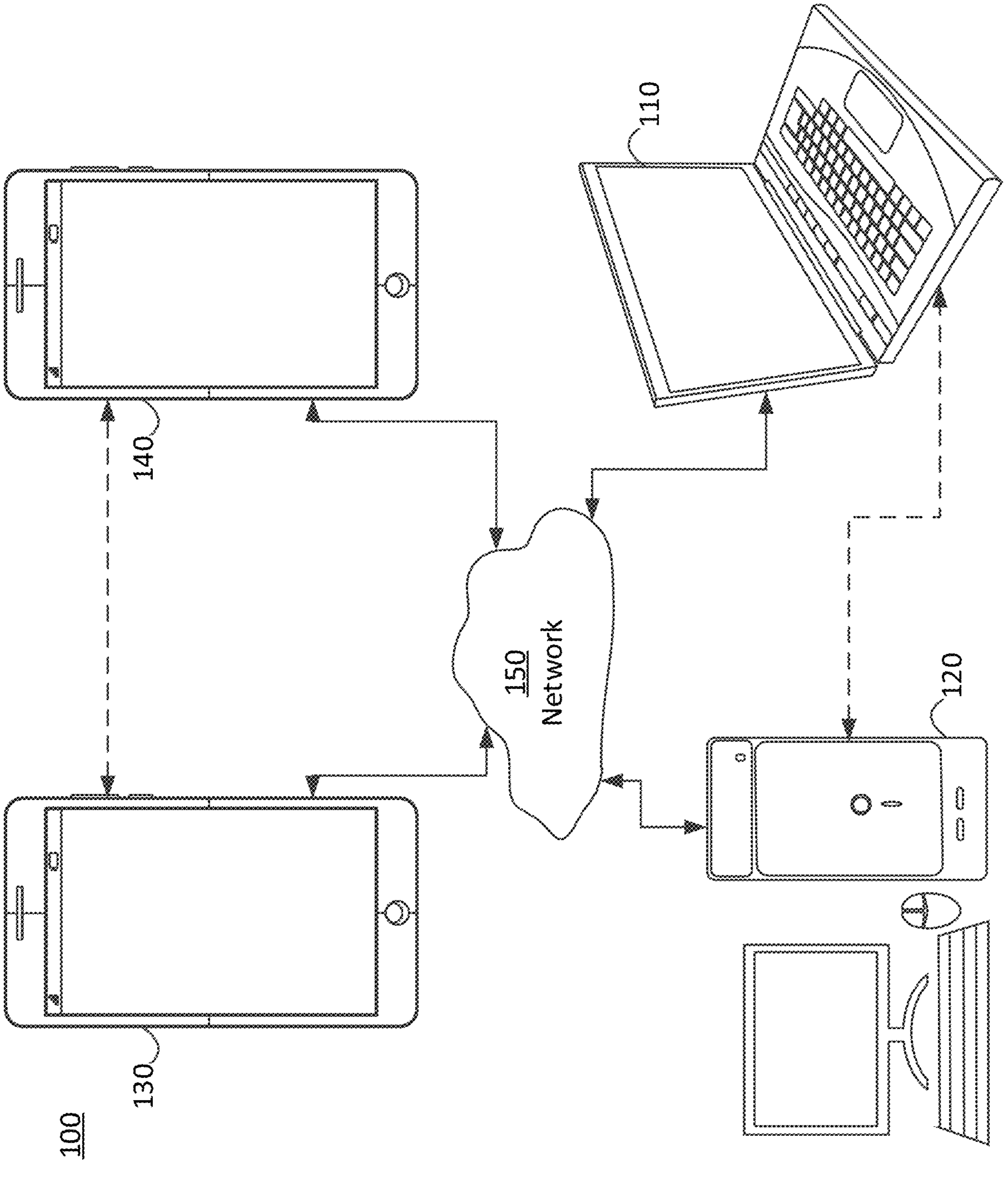
FIG. 1 is a schematic illustration of a block diagram of a communication system, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
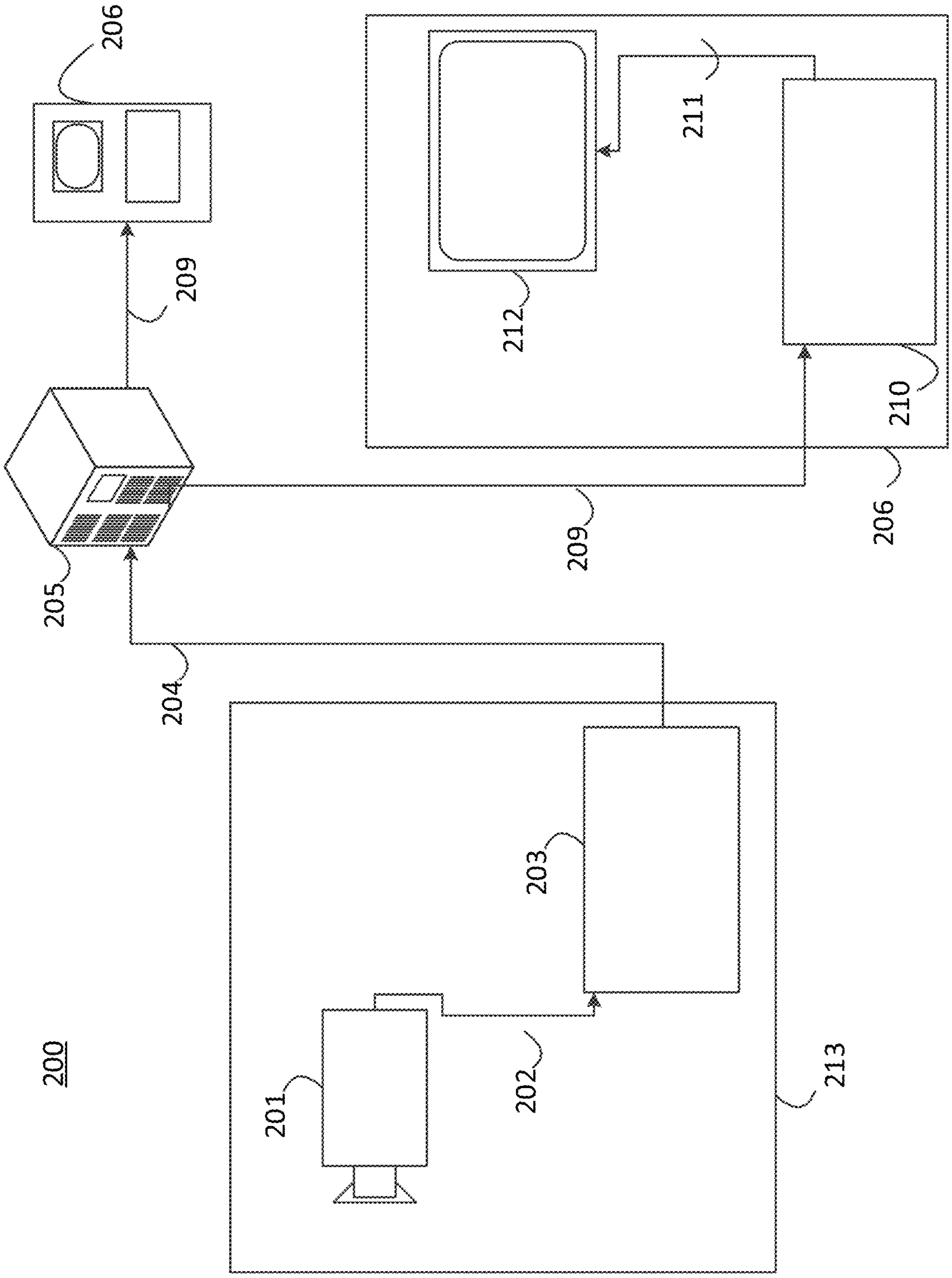
FIG. 2 is a schematic illustration of a block diagram of a communication system, in accordance with various embodiments of the present disclosure.

FIG. 2 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that may include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and may be processed by the encoder (203) coupled to the camera (201). The encoder (203) may include hardware, software, or a combination thereof to enable or implement aspects of the disclosed subject matter as described in more detail below. The encoded video bitstream (204) may include a lower data volume when compared to the sample stream, and may be stored on a streaming server (205) for future use. One or more streaming clients (206) may access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) may include a video decoder (210) and a display (212). The video decoder (210) can, for example, decode video bitstream (209), which is an incoming copy of the encoded video bitstream (204), and create an outgoing video sample stream (211) that may be rendered on the display (212) or another rendering device (not depicted). In some streaming systems, the video bitstreams (204, 209) may be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
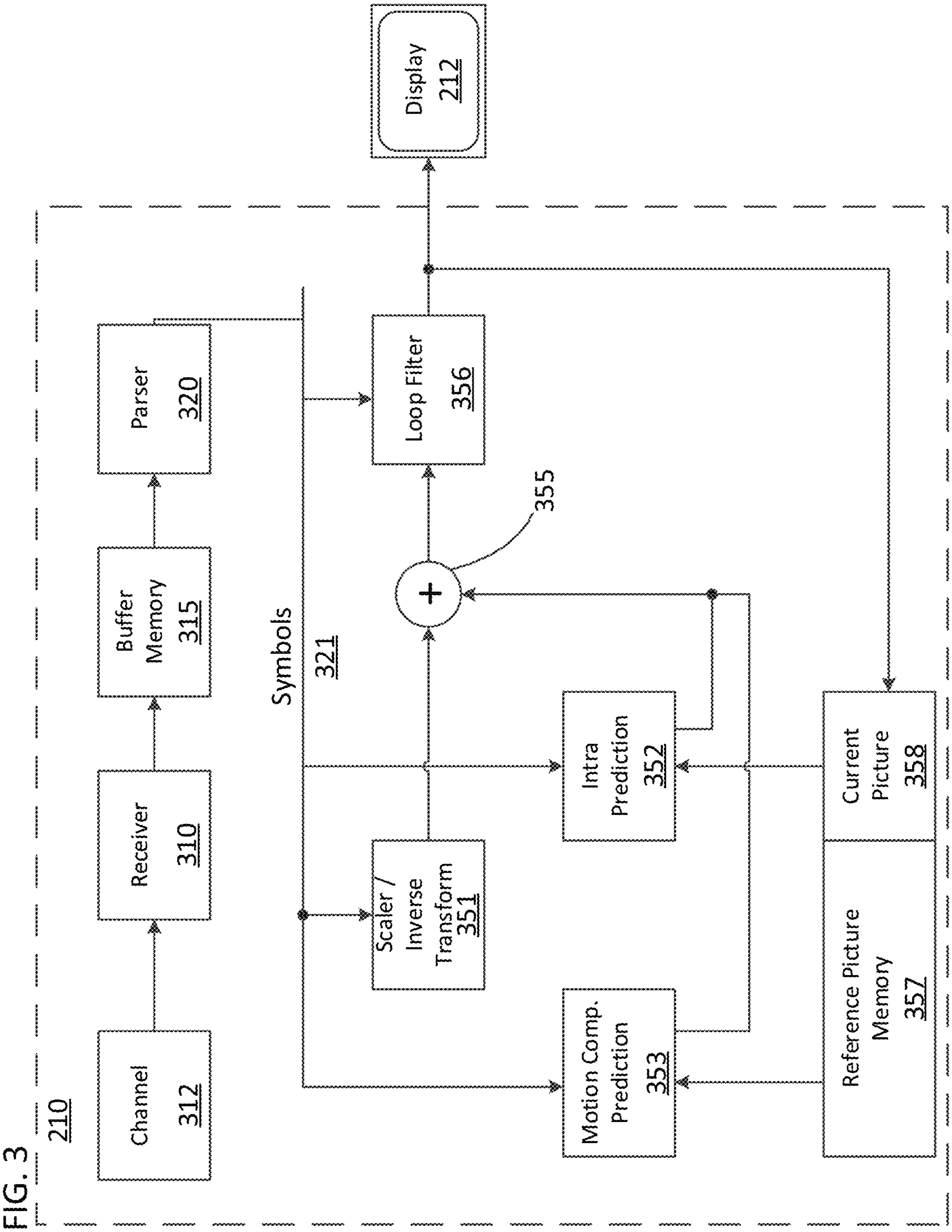
FIG. 3 is a schematic illustration of a block diagram of a decoder, in accordance with various embodiments of the present disclosure.

FIG. 3 illustrates an example functional block diagram of a video decoder (210) that is attached to a display (212) according to an embodiment of the present disclosure. The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory (358). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or may be small. For use on best effort packet networks such as the Internet, the buffer (315) may be required, may be comparatively large, and may be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence may be in accordance with a video coding technology or standard, and may follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups may include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321). Reconstruction of the symbols (321) may involve multiple different units depending on the type of the coded video picture or parts thereof (such as: inter and intra picture, inter and intra block), and other factors. Which units are involved, and how they are involved, may be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) may be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) may output blocks including sample values that may be input into the aggregator (355).

In some cases, the output samples of the scaler/inverse transform (351) may pertain to an intra coded block; that is: a block that is not using predictive information from previously reconstructed pictures, but may use predictive information from previously reconstructed parts of the current picture. Such predictive information may be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) may pertain to an inter coded, and potentially motion compensated block. In such a case, a Motion Compensation Prediction unit (353) may access reference picture memory (357) to fetch samples used for prediction. After motion compensating the fetched samples in accordance with the symbols (321) pertaining to the block, these samples may be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, may be controlled by motion vectors. The motion vectors may be available to the Motion Compensation Prediction unit (353) in the form of symbols (321) that may have, for example, X, Y, and reference picture components. Motion compensation also may include interpolation of sample values as fetched from the reference picture memory (357) when sub-sample exact motion vectors are in use, motion vector prediction mechanisms, and so forth.

The output samples of the aggregator (355) may be subject to various loop filtering techniques in the loop filter unit (356). Video compression technologies may include in-loop filter technologies that are controlled by parameters included in the coded video bitstream and made available to the loop filter unit (356) as symbols (321) from the parser (320), but may also be responsive to meta-information obtained during the decoding of previous (in decoding order) parts of the coded picture or coded video sequence, as well as responsive to previously reconstructed and loop-filtered sample values.

The output of the loop filter unit (356) may be a sample stream that may be output to a render device such as a display (212), as well as stored in the reference picture memory (357) for use in future inter-picture prediction.

Certain coded pictures, once fully reconstructed, may be used as reference pictures for future prediction. Once a coded picture is fully reconstructed and the coded picture has been identified as a reference picture (by, for example, parser (320)), the current reference picture may become part of the reference picture memory (357), and a fresh current picture memory may be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or SNR enhancement layers, redundant slices, redundant pictures, forward error correction codes, and so on.

Figure 4:
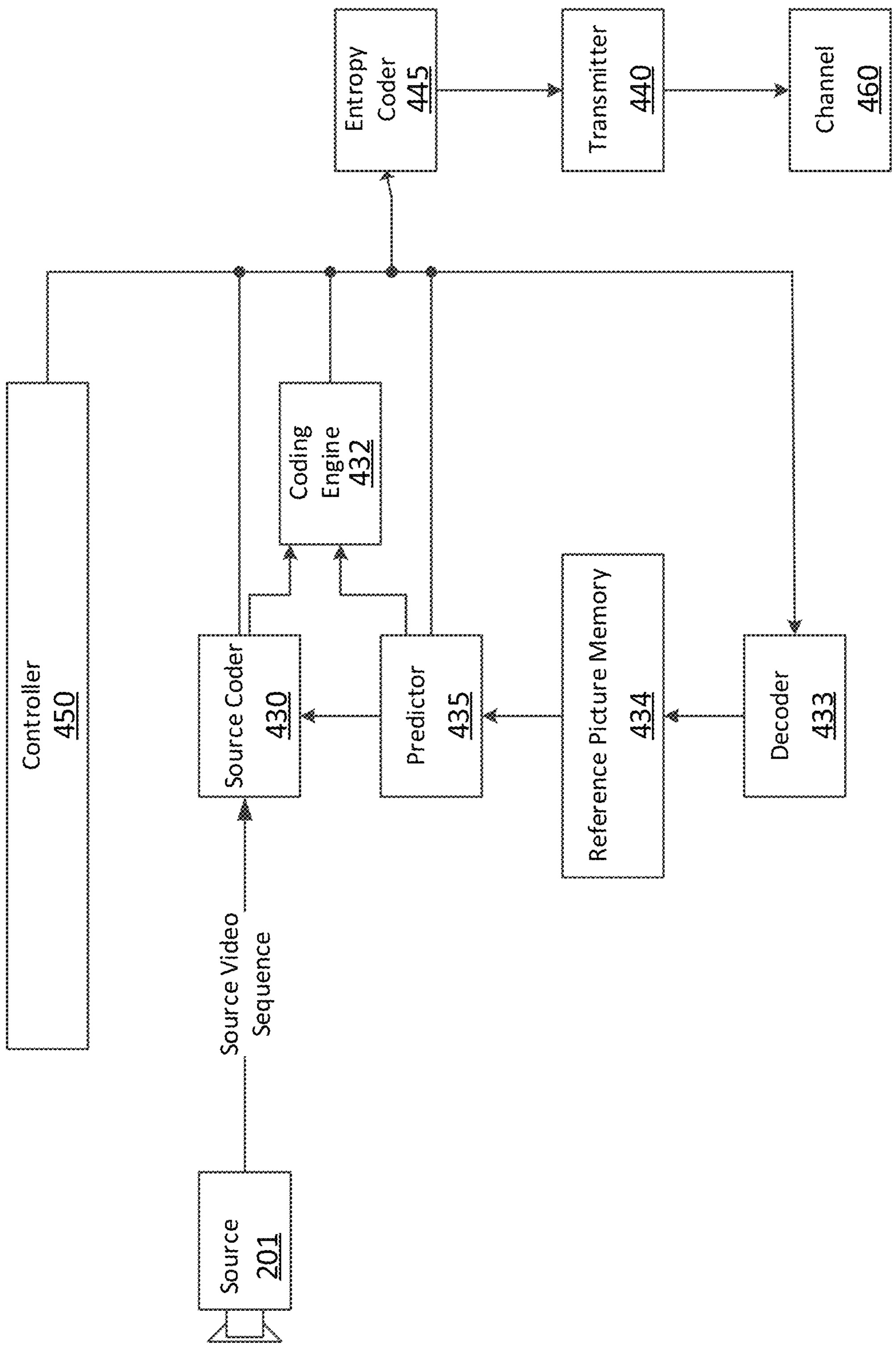
FIG. 4 is a block diagram of an encoder, in accordance with various embodiments of the present disclosure.

FIG. 4 illustrates an example functional block diagram of a video encoder (203) associated with a video source (201) according to an embodiment of the present disclosure. The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that may be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel may include one or more sample depending on the sampling structure, color space, etc. in use. A person skilled in the art may readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) may include rate control related parameters (picture skip, quantizer, lambda value of rate-distortion optimization techniques, . . . ), picture size, group of pictures (GOP) layout, maximum motion vector search range, and so forth. A person skilled in the art may readily identify other functions of controller (450) as they may pertain to video encoder (203) optimized for a certain system design.

Some video encoders operate in what a person skilled in the are readily recognizes as a "coding loop". As an over-simplified description, a coding loop may consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) may be the same as of a "remote" decoder (210), which has already been described in detail above in conjunction with FIG. 3. However, as symbols are available and en/decoding of symbols to a coded video sequence by the entropy coder (445) and the parser (320) may be lossless, the entropy decoding parts of decoder (210), including channel (312), receiver (310), buffer (315), and parser (320) may not be fully implemented in the local decoder (433).

An observation that may be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies may be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data. Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown). The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures may use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of embodiments of the disclosure in more detail, a few terms are introduced below that are referred to in the remainder of this description.

"Sub-Picture" henceforth refers to, in some cases, a rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

"Adaptive Resolution Change" (ARC) henceforth refers to mechanisms that allow the change of resolution of a picture or sub-picture within a coded video sequence, by the means of, for example, reference picture resampling. "ARC parameters" henceforth refer to the control information required to perform adaptive resolution change, that may include, for example, filter parameters, scaling factors, resolutions of output and/or reference pictures, various control flags, and so forth.

For each inter-predicted CU, motion parameters consisting of motion vectors, reference picture indices and reference picture list usage index, and additional information needed for the new coding feature of VVC is used for inter-predicted sample generation. The motion parameter may be signaled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighboring CUs, including spatial and temporal candidates, and additional schedules introduced in VVC. The merge mode may be applied to any inter-predicted CU, not only for skip mode. The alternative to the merge mode is the explicit transmission of motion parameters, where motion vector, corresponding reference picture index for each reference picture list and reference picture list usage flag and other needed information are signaled explicitly per each CU.

In VVC, the VTM reference software includes a number of new and refined inter prediction coding tools listed as follows:

- Extended merge prediction
- Merge motion vector difference (MMVD)
- AMVP mode with symmetric MVD signalling
- Affine motion compensated prediction
- Subblock-based temporal motion vector prediction (SbTMVP)
- Adaptive motion vector resolution (AMVR)
- Motion field storage: $1/16^{th}$ luma sample MV storage and 8×8 motion field compression
- Bi-prediction with CU-level weights (BCW)
- Bi-directional optical flow (BDOF)
- Decoder side motion vector refinement (DMVR)
- Combined inter and intra prediction (CIIP)
- Geometric partitioning mode (GPM)

The following disclosure provides details about inter predictions and related methods.

In VTM4, the merge candidate list is constructed by including the following five types of candidates in order:

- Spatial MVP from spatial neighbour CUs
- Temporal MVP from collocated CUs
- History-based MVP from an FIFO table
- Pairwise average MVP
- Zero MVs The size of the merge list may be signalled in a slice header and the maximum allowed size of merge list is 6 in VTM4. For each CU code in merge mode, an index of a best merge candidate may be encoded using truncated unary binarization (TU). The first bin of the merge index is coded with context and bypass coding is used for other bins. The generation process of each category of merge candidates is provided in this session.

Figure 5:
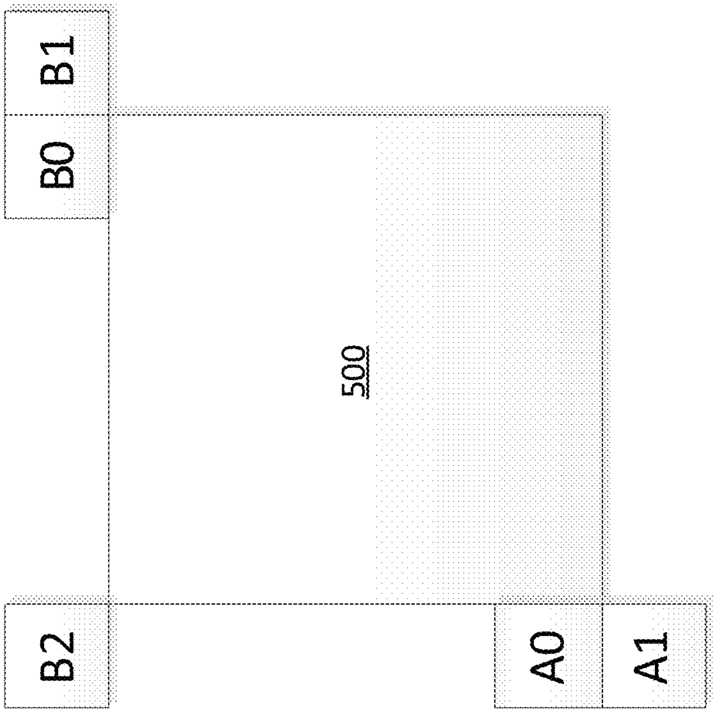
FIG. 5 illustrates example spatial merge candidates, in accordance with various embodiments of the present disclosure.
Figure 6:
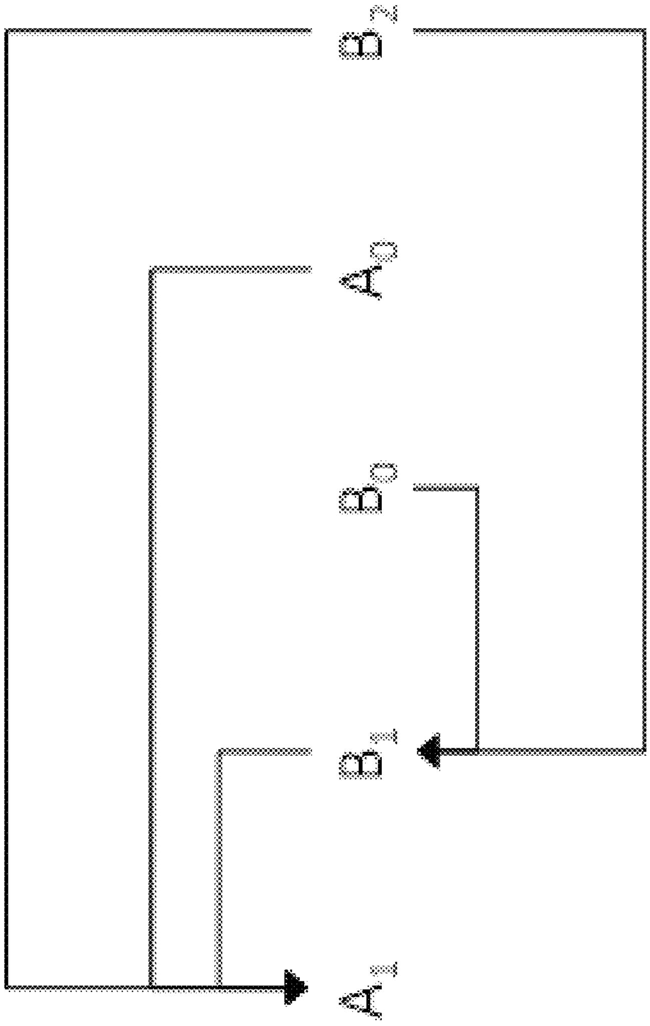
FIG. 6 illustrates example candidate pairs considered for a redundancy check of spatial merge candidates, in accordance with various embodiments of the present disclosure.

The derivation of spatial merge candidates in VVC may be the same to that in HEVC. A maximum of four merge candidates may be selected among candidates located in the positions depicted in FIG. 5. The order of derivation is $B_1$, $A_1$, $B_0$, $A_0$, and $B_2$. Position $B_2$ is considered only when any CU of position $A_0$, $B_0$, $B_1$, $A_1$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 6 are considered and a candidate is only added to the list if the corresponding candidate used for redundancy check has not the same motion information.

Figure 7:
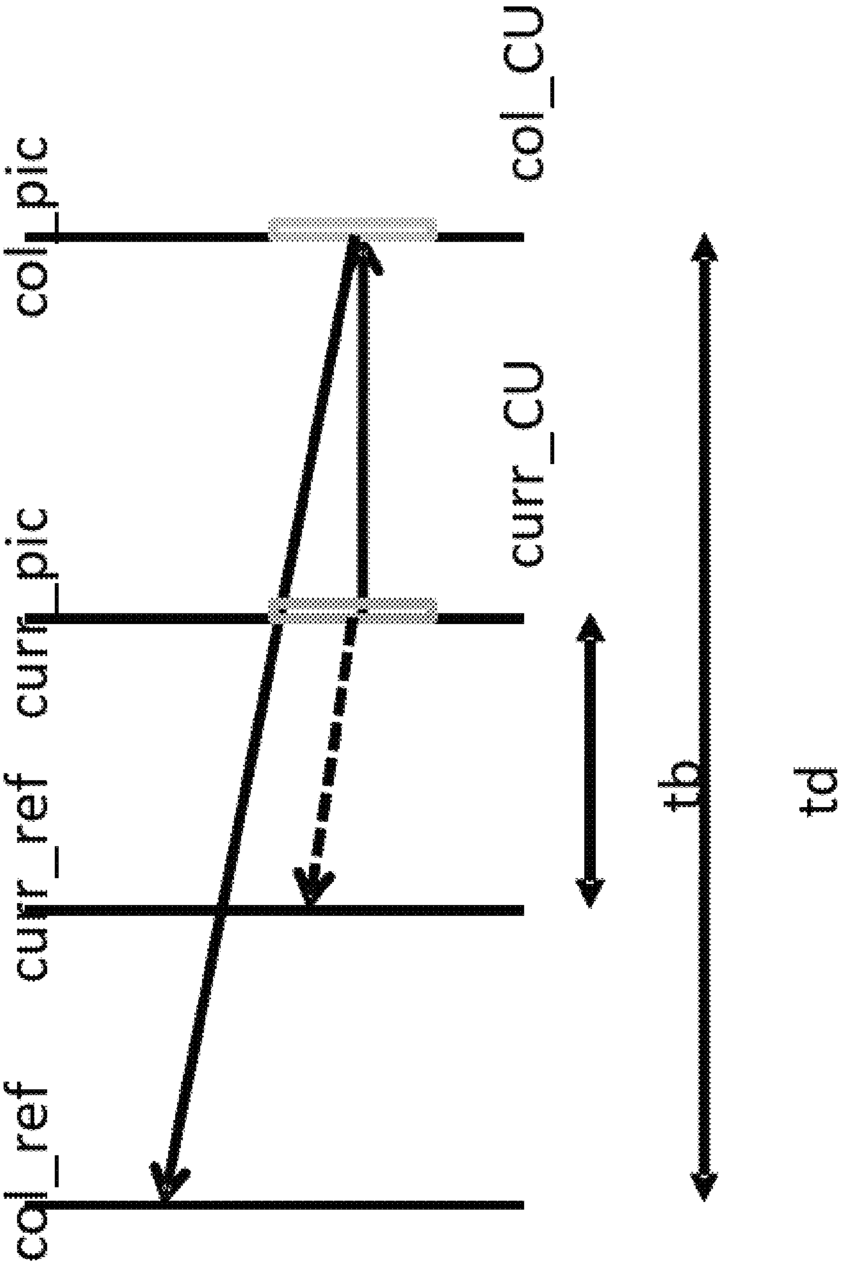
FIG. 7 illustrates example motion vector scaling for a temporal merge candidate, in accordance with various embodiments of the present disclosure.

In this operation, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 7, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 8:
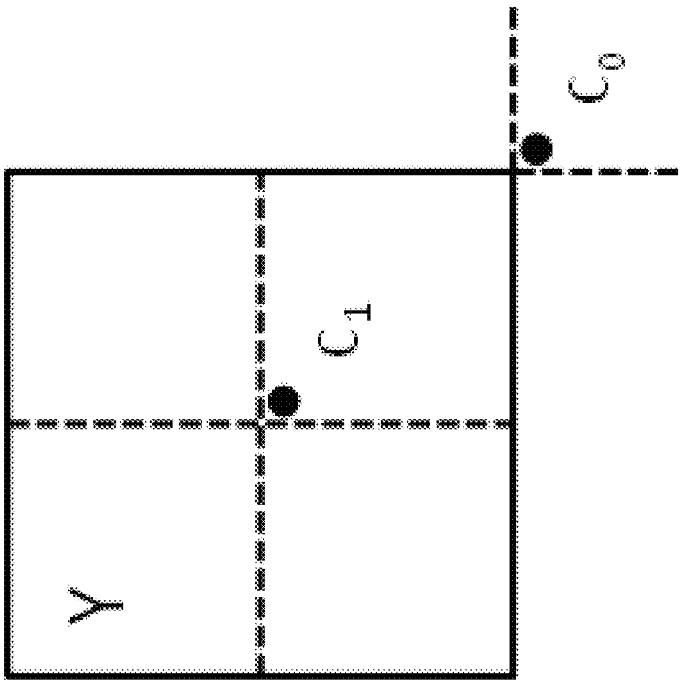
FIG. 8 illustrates example candidate positions for temporal merge candidates, in accordance with various embodiments of the present disclosure.

The position for the temporal candidate is selected between candidates $C_0$ and $C_1$, as depicted in FIG. 8. If CU at position $C_0$ is not available, is intra coded, or is outside of the current row of CTUs, position $C_1$ is used. Otherwise, position $C_0$ is used in the derivation of the temporal merge candidate.

The IBC mode was previously incorporated in the HEVC standard. However, it was necessary to reduce the implementation cost due to the whole already reconstructed area of the current picture. A drawback of the IBC mode in HEVC is the requirement of additional memory in DPB, for which hardware implementation usually employ external memory. The additional external memory access comes with the increased memory bandwidth. VVC uses a fixed memory that realizes the IBC mode by using on-chip memory to significantly decrease the memory bandwidth requirement and hardware complexity. The reference sample memory (RSM) may hold samples of a single CTU. The special feature of the RSM is the continuous update mechanism replacing the reconstructed samples of the left neighboring CTU with the reconstructed samples of the current CTU. Moreover, the block vector (BV) coding of the IBC mode employs the concept of merge list for inter prediction. The IBC list construction process considers two spatial neighbor's BV and five history-based BVs (HBVP), where only the first HBVP may be compared with spatial candidates when added to the candidate list. While the regular inter prediction uses two different candidate lists, one for the merge mode and the other for the regular mode, the candidate list in IBC is for both cases. However, the merge mode may use up to six candidates of the list, whereas the regular mode may use only the first two candidates. The block vector difference (BVD) coding employs the motion vector difference (MVD) process, resulting in a final BV of any magnitude, and also means that the reconstructed BV may point to an area outside of the reference sample area, requiring a correction by removing the absolute offset for each direction using the modulo operation with the width and height of the RSM.

In ECM5, intra template matching prediction (IntraTMP) is a special intra prediction mode that copies the best prediction block from the reconstructed part of the current frame, whose L-shaped template matches the current template. For a predefined search range, the encoder searches for the most similar template to the current template in a reconstructed part of the current frame and uses the corresponding block as a prediction block. The encoder then signals the usage of this mode, and the same prediction operation is performed at the decoder side.

Figure 9:
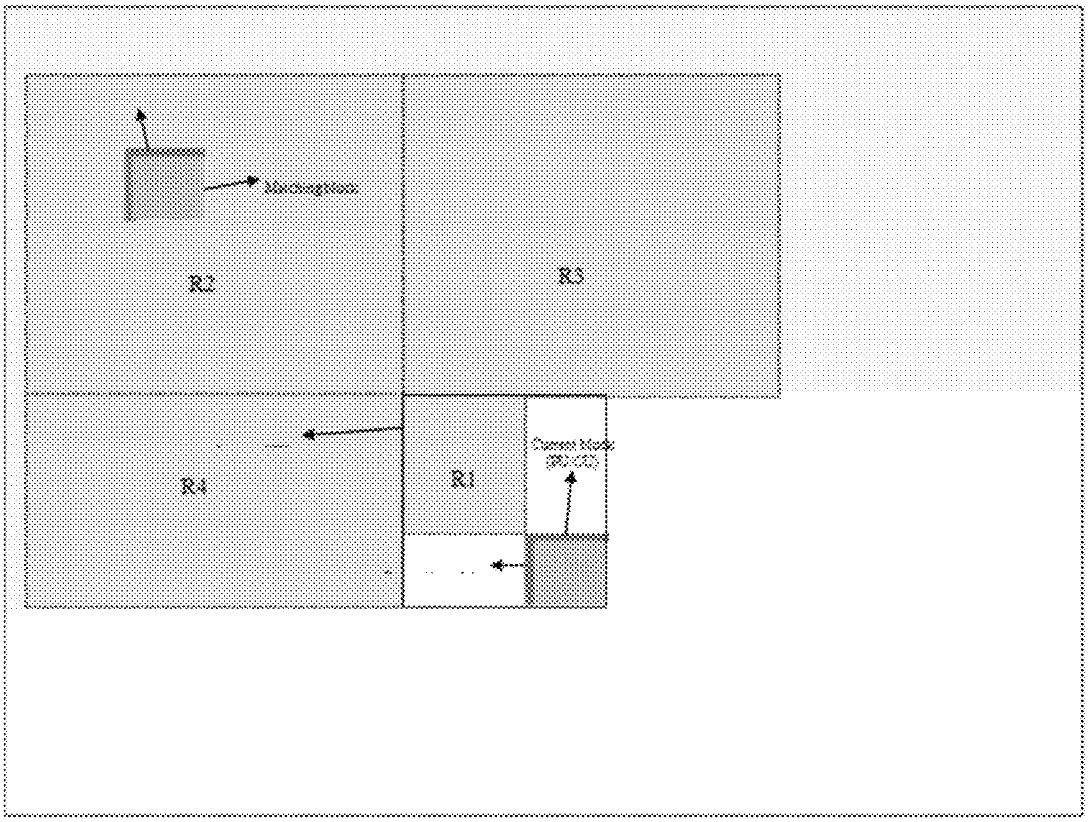
FIG. 9 illustrates an example intra template search area, in accordance with various embodiments of the present disclosure.

The prediction signal may be generated by matching the L-shaped causal neighbor of the current block with another block in a predefined search area in FIG. 9 consisting of:

R1: current CTU

R2: top-left CTU

R3: above CTU

R4: left CTU

SAD may be used as a cost function. Within each region, the decoder may search for the template that has the least SAD with respect to the current one and uses its corresponding block as a prediction block. The dimensions of all regions (SearchRange_w, SearchRange_h) may be set proportional to the block dimension (BlkW, BlkH) to have a fixed number of SAD comparisons per pixel. That is:

$$\text{SearchRange\_w} = a \times BlkW \quad \text{Eq. (1)}$$

$$\text{SearchRange\_h} = a \times BlkH, \quad \text{Eq. (2)}$$

where 'a' is a constant that controls the gain/complexity trade-off. In practice, 'a' may be equal to 5.

The intra template matching tool may be enabled for CUs with a size less than or equal to 64 in width and height. This maximum CU size for intra template matching may be configurable. The intra template matching prediction mode may be signaled at the CU level through a dedicated flag when DIMD is not used for current CU.

Figure 10:
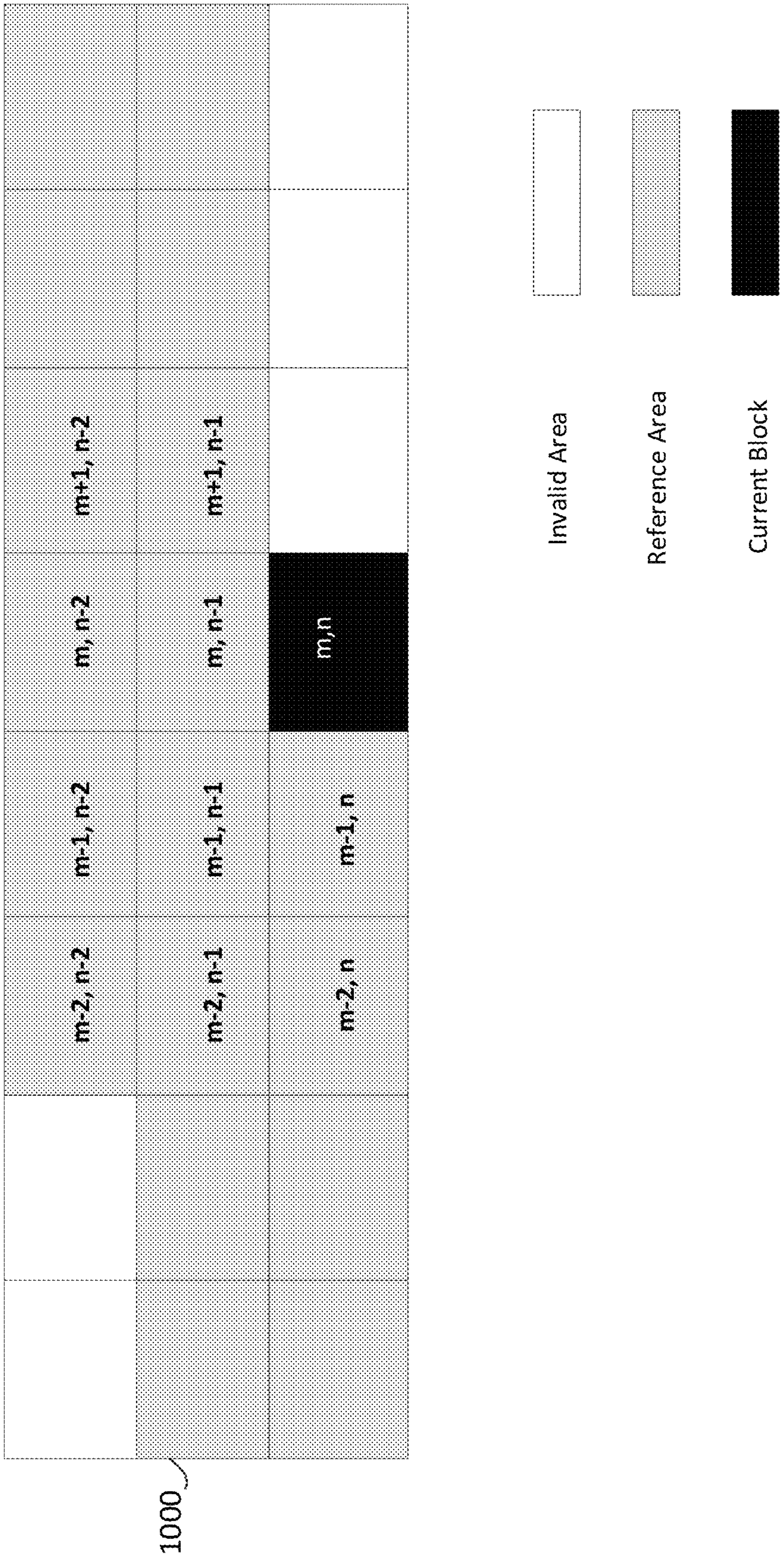
FIG. 10 illustrates an example reference area for IBC when CTU is coded, in accordance with various embodiments of the present disclosure.
Figure 11:
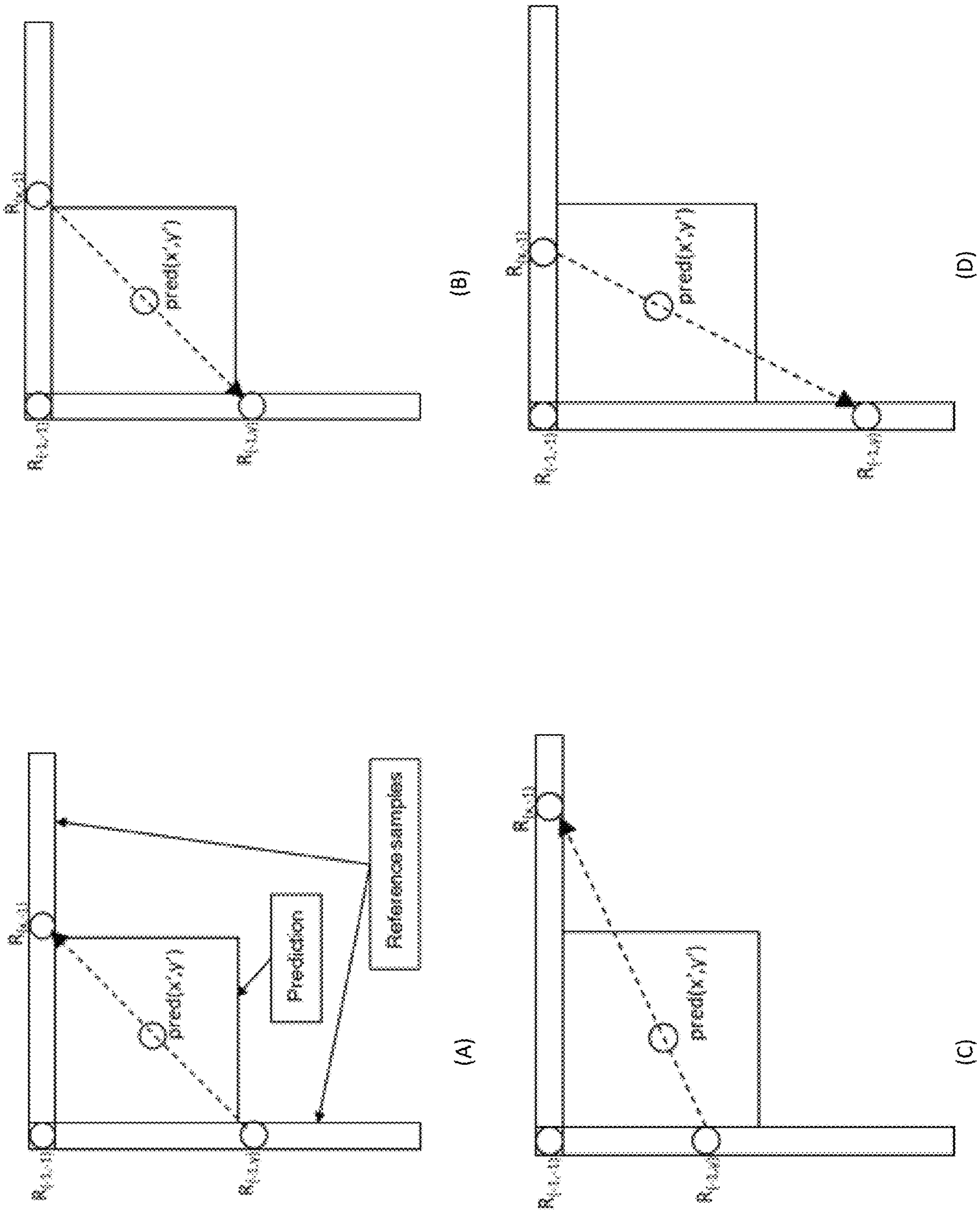
FIGS. 11(A)-(D) illustrates samples used by PDPC applied to diagonal and adjacent angular intra modes.

In ECM5, IntraTMP may need to access 320 upper samples and 320 left samples for a supporting 64×64 block. The extra memory may also help to improve the coding efficiency of the IBC mode. The reference area for the IBC mode may be extended to two rows above the CTU. FIG. 10 illustrates a picture (1000) with a reference area for coding CTU (m,n). Specifically, for CTU (m, n) to be coded, the reference area may include CTUs with index (m−2, n−2) . . . (W, n−2), (0, n−1) . . . (W, n−1), (0, n) . . . (m, n), where W denotes the maximum horizontal index within the current tile, slice or picture. This setting ensures that for a CTU size being 128, IBC does not require extra memory in the current ETM platform. The per-sample block vector search (or called local search) range may be limited to [−(C<<1), C>>2] horizontally and [−C, C>>2] vertically to adapt to the reference area extension, where C denotes the CTU size.

In order to reduce the complexity and the signalling overhead, the variation of possible intra prediction modes is also studied in JVET-W0110. In JVET-W0110, where two configurations are conducted to study the effect from the variation of possible intra prediction mode for GPM with inter and intra prediction. The first configuration only tries the parallel and perpendicular intra directional modes against the geometric partition line. In addition to the parallel and perpendicular intra angular modes against the geometric partition line, the Planar mode may also tested in second configuration. There are two or three possible intra prediction modes that are tested for the geometric partition in GPM with inter and intra prediction.

In VVC, the results of intra prediction of the DC, planar, and several angular modes are further modified by a position dependent intra prediction combination (PDPC) method. PDPC is an intra prediction method which invokes a combination of the boundary reference samples and HEVC style intra prediction with filtered boundary reference samples. PDPC may be applied to the following intra modes without signaling: planar, DC, intra angles less than or equal to horizontal, and intra angles greater than or equal to vertical and less than or equal to 80. If the current block is Bdpcm mode or the MRL index is larger than 0, PDPC is not applied. The prediction sample pred(x',y') is predicted using an intra prediction mode (DC, planar, angular) and a linear combination of reference samples according to the following equations:

$$pred(x', y') = \mathrm{Clip}\big(0, (1 \ll BitDepth) - 1, \big(wL \times R_{-1,y'} + wT \times R_{x',-1} + (64 - wL - wT) \times pred(x', y') + 32\big) \gg 6\big), \quad \text{Eq. (1)}$$

where $R_{x,-1}$, $R_{-1,y}$ represent the reference samples located at the top and left boundaries of current sample (x, y), respectively.

$$w_L = 32 \gg ((x \ll 1) \gg s \quad \text{Eq. (2)}$$

$$w_T = 32 \gg ((y \ll 1) \gg s, \quad \text{Eq. (3)}$$

where s is a parameter controlling the decaying speed of top and left reference sample weighting from top to down and from left to right, respectively.

If PDPC is applied to DC, planar, horizontal, and vertical intra modes, additional boundary filters are not needed, as required in the case of HEVC DC mode boundary filter or horizontal/vertical mode edge filters. The PDPC process for DC and Planar modes may be identical. For angular modes, if the current angular mode is HOR_IDX or VER_IDX, left or top reference samples may not be used, respectively. The PDPC weight and scale factors may be dependent on prediction modes and the block sizes. PDPC may be applied to the block with both width and height greater than or equal to 4.

FIGS. 11(A)-11(D) illustrate the definition of reference samples ($R_{x,-1}$ and $R_{-1,y}$) for PDPC applied over various prediction modes. The prediction sample pred (x', y') may be located at (x', y') within the prediction block. As an example, the coordinate x of the reference sample $R_{x,-1}$ is given by: x=x'+y'+1, and the coordinate y of the reference sample $R_{-1,y}$ may be similarly given by: y=x'+y'+1 for the diagonal modes. For the other angular modes, the reference samples $R_{x,-1}$ and $R_{-1,y}$ may be located in fractional sample positions. In this case, the sample value of the nearest integer sample location may be used.

With IntraBC and IntraTMP, the prediction block may be indicated by a block vector pointing to another block in the same picture. Therefore, there may be block discontinuities at the prediction block boundaries compared to the neighboring reconstructed samples. Such discontinuities at prediction block boundaries limit the coding efficiency of IntraBC and IntraTMP, especially on camera captured content.

Embodiments of the present disclosure may be directed to applying boundary filtering for the prediction block of IntraBC and IntraTMP. The boundary filtering applies adjustment to the prediction samples at block boundaries using the nearby reconstructed sample from neighboring coded block. The embodiments of the present disclosure may be used separately or combined in any order. Furthermore, the embodiments of the present disclosure may be implemented by processing circuitry (e.g., one or more processors or one or more integrated circuits). In one example, the one or more processors execute a program that is stored in a non-transitory computer-readable medium.

In some embodiments, boundary filtering is applied for the prediction block of IntraBC and IntraTMP. The boundary filtering applies one or more adjustments to the prediction samples at block boundaries using the nearby reconstructed sample from previously coded area. In some embodiments, the boundary filtering is the same as the PDPC applied on other intra prediction modes (e.g., DC and Planar mode).

In some embodiments, the boundary filtering is PDPC with some adjustments comparing to the PDPC applied on other intra prediction modes (e.g., DC and Planar mode). In one example, a different value of parameter s may be used when comparing to PDPC used for other intra prediction modes.

Figure 12:
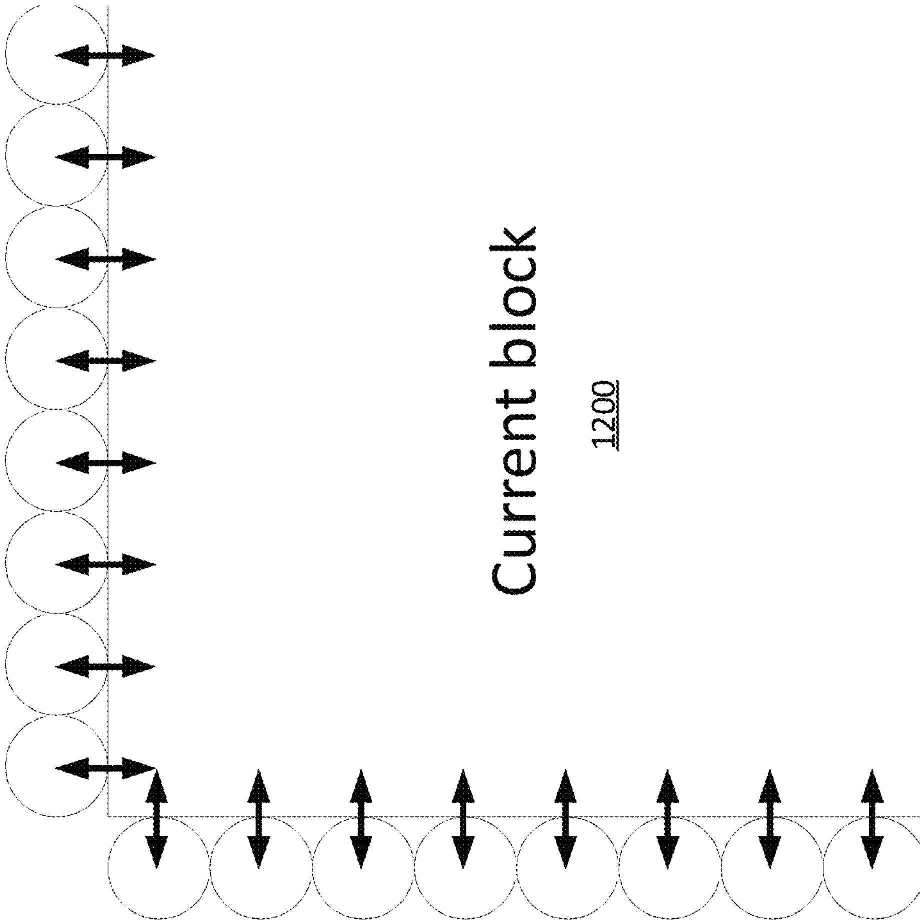
FIG. 12 illustrates an example boundary filtering using a two tap filter.

In some embodiments, for the left (top) boundary prediction samples, the boundary filtering is a weighted average of left (top) neighboring reconstructed samples and left (top) boundary prediction samples. An example of the boundary filtering is shown in FIG. 12 using two tap filters for top row of boundary prediction samples and left column of boundary prediction samples for block (1200).

In some embodiments, the number of top rows and left columns of prediction samples that are filtered using boundary filter may depend on the block size. In some embodiments, block-level and/or HLS-level flag is signalled to indicate whether PDPC is applied to IntraBC and/or IntraTMP, the HLS may be a flag in VPS, PPS, SPS, APS, Slice header, frame header, tile header or CTU header.

In some embodiments, template matching (TM) cost (similar to that used for IntraTMP as in 4.3) of the current IBC or IntraTMP block may be used to determine whether and how to apply the boundary filter. For example, for a block coded with IBC model, the template matching cost may be calculated based on the template area pointed by the BV of the current block. When the TM cost is below or equal to a threshold value T1, the boundary filtering may be disabled. For example, T1 may be equal to 0.

In another example, for a block coded in IntraTMP mode, the template matching cost of IntraTMP mode may be used to check against the threshold T2. When the TM cost is below or equal to a threshold value T2, the proposed boundary filtering may be disabled. In some embodiments, the value of T1 and the value of T2 may be different. In some embodiments, one or more PDPC parameters, such as s, may depend on the template matching cost.

In some embodiments, the boundary filter is not applied when the current coded bock is coded in IBC merge mode. In other embodiments, only the left neighboring reconstructed samples may be used for boundary filtering when the current block is coded in IBC merge mode and the BVP is derived from neighboring top or top-right spatial candidates. In other embodiments, only the top neighboring reconstructed samples are used for boundary filtering when the current block is coded in IBC merge mode and the BVP is derived from neighboring left or left-bottom spatial candidates.

In some embodiments, the residuals of the block coded by IntraTMP and IntraBC may be used to determine whether and how to apply boundary filter. For example, when the energy of a residual is greater than a threshold T1', boundary filtering may be applied. In another example, when the energy of residual is less than a threshold T2', boundary filtering may not be applied. In another example, the energy of the may be measured by SAD, SSE, SATD, MSE of the residual block. In another example, the value of threshold T1' and T2' may be different for block coded by IntraTMP and IntraBC. In one example, the PDPC parameter, such as s, may depend on the energy of the residual.

Figure 13:
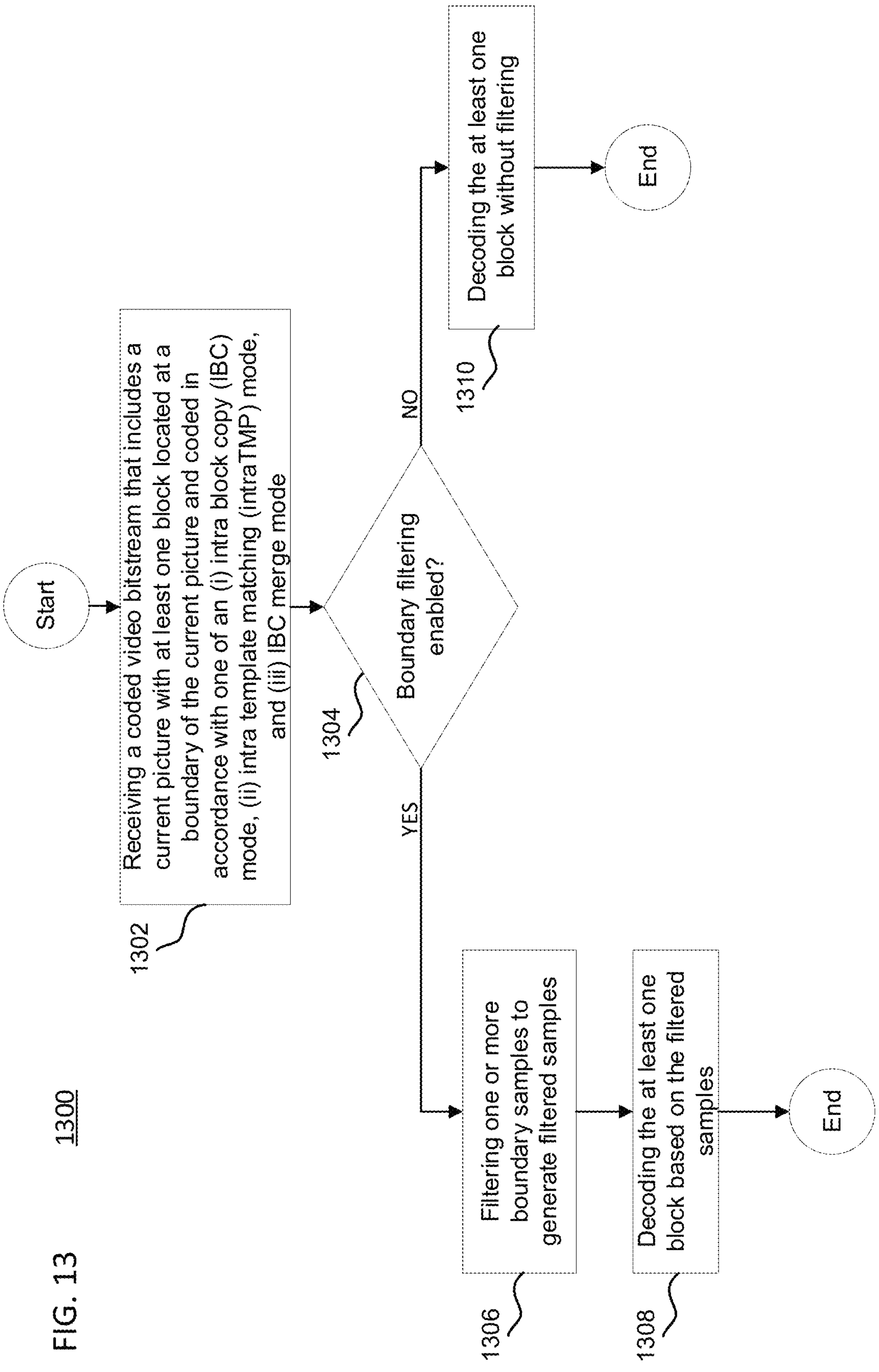
FIG. 13 illustrates a flow chart of an embodiment of a process for performing boundary filtering for the IBC and the intraTMP mode, in accordance with various embodiments of the present disclosure.

FIG. 13 illustrates an embodiment of a process (1300) for performing boundary filtering. The process (1300) may be performed by a decoder such as decoder (210). The process may start at operation (1302) where a coded video bitstream that includes a current picture with at least one block located at a boundary of a current picture, where the at least one block is coded in accordance with one of an (i) IBC mode, (ii) intraTMP mode, and (iii) IBC merge mode.

The process proceeds to operation (1304) where it is determined whether boundary filtering is enabled. The determination of whether the boundary filtering is enabled may be made based on whether a predetermined condition is satisfied. For example, the predetermined condition is satisfied if the at least one block is encoded in one of the IBC mode and the intraTMP mode. As another example, the predetermined condition may be satisfied if the at least one block is encoded in one of the IBC mode and the intraTMP mode and in response to a determination that a template matching cost is below or equal to a threshold value. The predetermined condition may be based on a syntax element included in the received coded video bitstream.

If it is determined the predetermined condition to enable boundary filtering is satisfied, the process proceeds to operation (1306) where one or more boundary samples are filtered to generate boundary samples. The process proceeds to operation (1308) the at least one block is decoded based on the filtered samples. If it is determined the predetermined condition to enable boundary filtering is not satisfied, the process proceeds from operation (1304) to operation (1310) where the at least one block is decoded without filtering.

Figure 14:
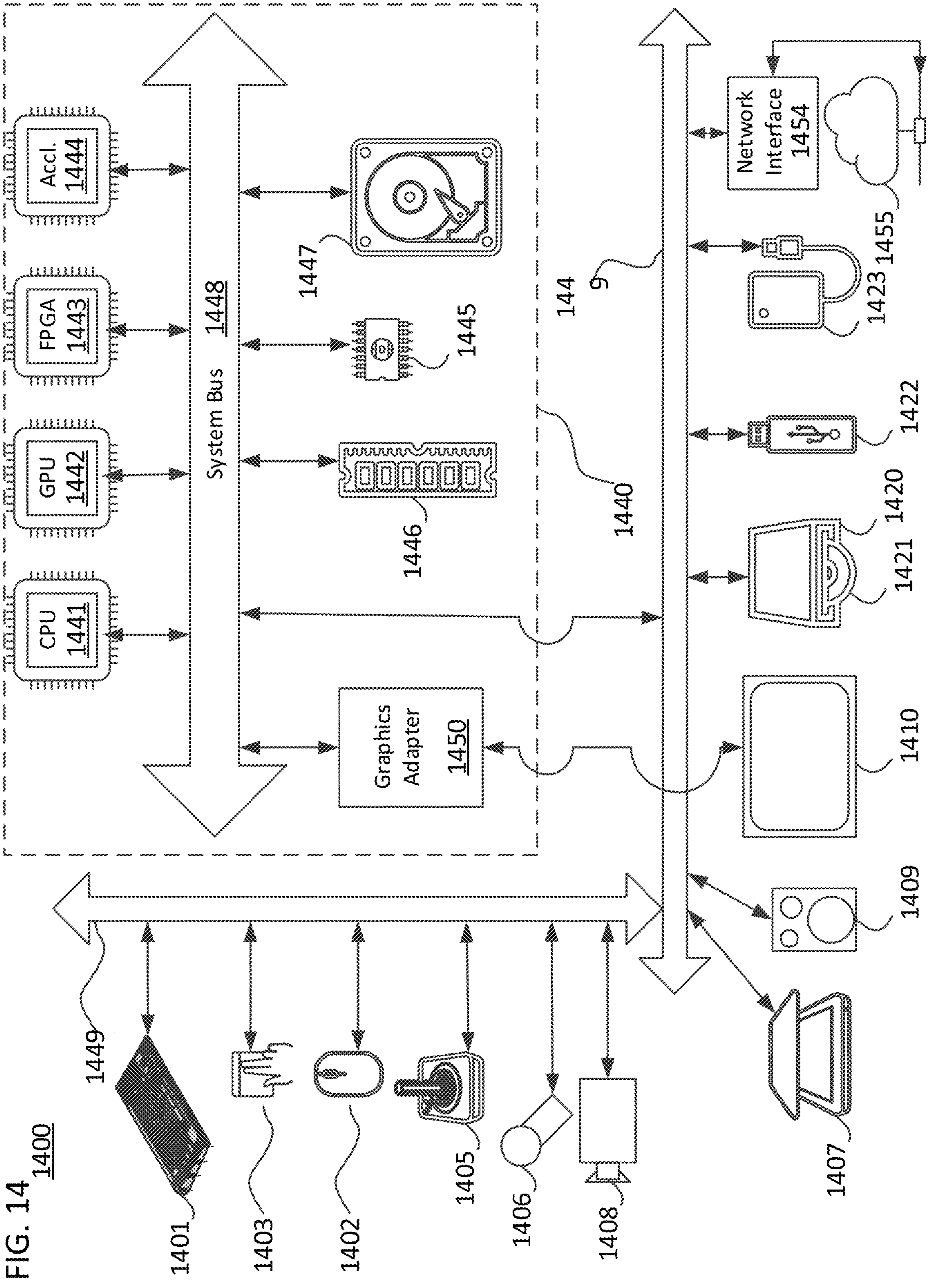
FIG. 14 illustrates an example computer system, in accordance with various embodiments of the present disclosure.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove, joystick (1405), microphone (1406), scanner (1407), and camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove, or joystick (1405), but there may also be tactile feedback devices that do not serve as input devices). For example, such devices may be audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) may also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400); others are commonly integrated into the core of the computer system 1400 by attachment to a system bus as described below (for example Ethernet interface into a PC computer system or cellular network interface into a smartphone computer system). Using any of these networks, computer system (1400) may communicate with other entities. Such communication may be uni-directional, receive only (for example, broadcast TV), uni-directional send-only (for example CANbus to certain CANbus devices), or bidirectional, for example to other computer systems using local or wide area digital networks. Such communication may include communication to a cloud computing environment (1455). Certain protocols and protocol stacks may be used on each of those networks and network interfaces as described above.

Aforementioned human interface devices, human-accessible storage devices, and network interfaces (1454) may be attached to a core (1440) of the computer system (1400).

The core (1440) may include one or more Central Processing Units (CPU) (1441), Graphics Processing Units (GPU) (1442), specialized programmable processing units in the form of Field Programmable Gate Areas (FPGA) (1443), hardware accelerators (1444) for certain tasks, and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) may be accessible in the form of one or more physical plugs to enable extensions by additional CPUs, GPU, and the like. The peripheral devices may be attached either directly to the core's system bus (1448), or through a peripheral bus (1449). Architectures for a peripheral bus include PCI, USB, and the like. A graphics adapter (1450) may be included in the core (1440).

CPUs (1441), GPUs (1442), FPGAs (1443), and accelerators (1444) may execute certain instructions that, in combination, may make up the aforementioned computer code. That computer code may be stored in ROM (1445) or RAM (1446). Transitional data may be also be stored in RAM (1446), whereas permanent data may be stored for example, in the internal mass storage (1447). Fast storage and retrieve to any of the memory devices may be enabled through the use of cache memory, that may be closely associated with one or more CPU (1441), GPU (1442), mass storage (1447), ROM (1445), RAM (1446), and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture (1400), and specifically the core (1440) may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core (1440) that are of non-transitory nature, such as core-internal mass storage (1447) or ROM (1445). The software implementing various embodiments of the present disclosure may be stored in such devices and executed by core (1440). A computer-readable medium may include one or more memory devices or chips, according to particular needs. The software may cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system may provide functionality as a result of logic hardwired or otherwise embodied in a circuit (for example: accelerator (1444)), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

ABBREVIATIONS

HEVC: High Efficiency Video Coding
HDR: High dynamic range
SDR: Standard dynamic range
VVC: Versatile Video Coding
JVET: Joint Video Exploration Team
GPM: Geometric partition mode
IBC, IntraBC: Intra block copy
IntraTMP: Intra template matching
PDPC: Position-Dependent Predictor Combinations
HLS: High-Level Syntax The above disclosure also encompasses the embodiments listed below:

(1) A method performed by at least one processor in a video decoder, the method including: receiving a coded video bitstream that includes a current picture with at least one block located at a boundary of the current picture and coded in accordance with one of (i) an intra block copy (IBC) mode, (ii) an intra template matching (intraTMP) mode, and (iii) an IBC merge mode; determining whether boundary filtering is enabled for the at least one block based on a syntax element in the received coded video stream; based on a determination that the boundary filtering is enabled: filtering one or more boundary samples corresponding to the at least one block to generate one or more filtered samples, and decoding the at least one block based on the generated one or more filtered samples; and based on a determination that the boundary filtering is not enabled, decoding the at least one block without filtering the one or more boundary samples.

(2) The method according to feature (1), in which the syntax element specifies that the boundary filtering is enabled based on a determination that the at least one block is encoded in one of the IBC mode and the intraTMP mode.

(3) The method according to feature (1) or (2), in which the boundary filtering includes a position-dependent predictor combination (PDPC) filter.

(4) The method according to any one of features (1)-(3), in which the boundary filtering includes a weighted average of neighboring reconstructed samples and adjacent boundary prediction samples.

(5) The method according to feature (4), in which the neighboring reconstructed samples include one or more columns located left of the at least one block.

(6) The method of feature (5), in which a number of columns located left of the at least one block that are used in the boundary filtering is dependent on a block size of the at least one block.

(7) The method according to feature (4), in which the neighboring reconstructed samples include one or more rows located top of the at least one block.

(8) The method according to feature (7), in which a number of rows located top of the at least one block that are used in the boundary filtering is dependent on a block size of the at least one block.

(9) The method according to any one of features (1)-(8), in which the at least one block is encoded in the IBC mode, and in which the syntax element specifies that the boundary filtering is disabled based on a determination that a template matching cost calculated based on a template area pointed to by a block vector of the at least one block is below or equal to a threshold value.

(10) The method according to feature (9), in which the boundary filtering includes a position-dependent predictor combination (PDPC) filter, and in which a S parameter of the PDPC filter is dependent on the template matching cost.

(11) The method according to any one of features (1)-(8) and (10), in which the at least one block is encoded in the intraTMP mode, in which the syntax element specifies that the boundary filtering is disabled based on a determination that a template matching cost of a template used in the intraTMP mode is below or equal to a threshold value.

(12) The method according to feature (11), in which the boundary filtering includes a position-dependent predictor combination (PDPC) filter, and in which a S parameter of the PDPC filter is dependent on the template matching cost.

(13) The method according to any one of features (1)-(12), in which the syntax element specifies that the boundary filtering is disabled based on a determination the at least one block is coded in the IBC merge mode.

(14) The method according to any one of features (1)-(13), in which the syntax element specifies that the boundary filtering is enabled based on a determination the at least one block is coded in the IBC merge mode, in which the boundary filtering uses reconstructed neighboring samples located left of the at least one block, and in which a block vector of the at least one block is derived from spatial candidates located top of the at least one block or top-right of the at least one block.

(15) The method according to any one of features (1)-(13), in which the syntax element specifies the boundary filtering is enabled based on a determination the at least one block is coded in the IBC merge mode, in which the boundary filtering uses reconstructed neighboring samples located top of the at least one block, and in which a block vector of the at least one block is derived from spatial candidates located left of the at least one block or bottom-left of the at least one block.

(16) A video decoder including: at least one memory configured to store computer program code; and at least one processor configured to access the computer program code and operate as instructed by the computer program code, the computer program code including: receiving code configured to cause the at least one processor to receive a coded video bitstream that includes a current picture with at least one block located at a boundary of the current picture and coded in accordance with one of (i) an intra block copy (IBC) mode, (ii) an intra template matching (intraTMP) mode, and (iii) an IBC merge mode, determining code configured to cause the at least one processor to determine whether boundary filtering is enabled for the at least one block based on a syntax element in the received coded video stream, filtering code, and determining code, in which based on a determination that the boundary filtering is enabled: the filtering code is configured to cause the at least one processor to filter one or more boundary samples corresponding to the at least one block to generate one or more filtered samples, and the decoding code is configured to cause the at least one processor to decode the at least one block based on the generated one or more filtered samples, and in which based on a determination that the boundary filtering is not enabled, the decoding code is configured to cause the at least one processor to decode the at least one block without filtering the one or more boundary samples.

(17) The video apparatus according to feature (16), in which the syntax element specifies that the boundary filtering is enabled based on a determination that the at least one block is encoded in one of the IBC mode and the intraTMP mode.

(18) The video apparatus according to feature (16) or (17), in which the boundary filtering includes a position-dependent predictor combination (PDPC) filter.

(19) The video apparatus according to any one of features (16)-(18), in which the boundary filtering includes a weighted average of neighboring reconstructed samples and adjacent boundary prediction samples.

(20) A non-transitory computer readable medium having instructions stored therein, which when executed by a processor in a video decoder cause the processor to execute a method including: receiving a coded video bitstream that includes a current picture with at least one block located at a boundary of the current picture and coded in accordance with one of (i) an intra block copy (IBC) mode, (ii) an intra template matching (intraTMP) mode, and (iii) an IBC merge mode; determining whether boundary filtering is enabled for the at least one block based on a syntax element in the received coded video stream; based on a determination that the boundary filtering is enabled: filtering one or more boundary samples corresponding to the at least one block to generate one or more filtered samples, and decoding the at least one block based on the generated one or more filtered samples; and based on a determination that the boundary filtering is not enabled, decoding the at least one block without filtering the one or more boundary samples.

What is claimed is:

1. A method performed by at least one processor in a video decoder, the method comprising:

receiving a coded video bitstream that includes a current picture with at least one block located at a boundary of the current picture and coded in accordance with an intra template matching (intraTMP) mode;

determining boundary filtering is enabled for the at least one block based on a syntax element in the received coded video stream;

filtering one or more boundary samples corresponding to the at least one block to generate one or more filtered samples; and decoding the at least one block based on the generated one or more filtered samples.

2. The method according to claim 1, wherein the syntax element specifies that the boundary filtering is enabled based on a determination that the at least one block is encoded in the intraTMP mode.

3. The method according to claim 1, wherein the boundary filtering includes a position-dependent predictor combination (PDPC) filter.

4. The method according to claim 1, wherein the boundary filtering includes a weighted average of neighboring reconstructed samples and adjacent boundary prediction samples.

5. The method according to claim 4, wherein the neighboring reconstructed samples include one or more columns located left of the at least one block.

6. The method of claim 5, wherein a number of columns located left of the at least one block that are used in the boundary filtering is dependent on a block size of the at least one block.

7. The method according to claim 4, wherein the neighboring reconstructed samples include one or more rows located top of the at least one block.

8. The method according to claim 7, wherein a number of rows located top of the at least one block that are used in the boundary filtering is dependent on a block size of the at least one block.

9. The method of claim 1, wherein the syntax element specifies that the boundary filtering is disabled based on a determination that a template matching cost of a template used in the intraTMP mode is below or equal to a threshold value.

10. The method according to claim 9, wherein the boundary filtering includes a position-dependent predictor combination (PDPC) filter, and wherein a S parameter of the PDPC filter is dependent on the template matching cost.

11. A method performed by at least one processor in a video encoder, the method comprising:

receiving a current picture with at least one block located at a boundary of the current picture;

filtering one or more boundary samples corresponding to the at least one block to generate one or more filtered samples;

encoding the at least one block based on the generated one or more filtered samples and in accordance with the intra template matching (intraTMP) mode;

generating a coded video bitstream that includes the encoded at least one block, a syntax element that indicates that boundary filtering is enabled for the at least one block in accordance with the intraTMP mode.

12. The method according to claim 11, wherein the syntax element specifies that the boundary filtering is enabled based on a determination that the at least one block is encoded in the intraTMP mode.

13. The method according to claim 11, wherein the boundary filtering includes a position-dependent predictor combination (PDPC) filter.

14. The method according to claim 11, wherein the boundary filtering includes a weighted average of neighboring samples and adjacent boundary prediction samples.

15. The method according to claim 14, wherein the neighboring samples include one or more columns located left of the at least one block.

16. The method of claim 15, wherein a number of columns located left of the at least one block that are used in the boundary filtering is dependent on a block size of the at least one block.

17. The method according to claim 14, wherein the neighboring samples include one or more rows located top of the at least one block.

18. The method according to claim 17, wherein a number of rows located top of the at least one block that are used in the boundary filtering is dependent on a block size of the at least one block.

19. The method of claim 11, wherein the syntax element specifies that the boundary filtering is disabled based on a determination that a template matching cost of a template used in the intraTMP mode is below or equal to a threshold value.

20. A non-transitory computer readable medium storing a bitstream generated by a method performed by at least one processor, the method comprising:

processing a coded video bitstream that includes a current picture with at least one block located at a boundary of the current picture and coded in accordance with an intra template matching (intraTMP) mode, wherein boundary filtering is enabled for the at least one block based on a syntax element in the received coded video stream, wherein filtering is performed on one or more boundary samples corresponding to the at least one block to generate one or more filtered samples, and wherein the at least one block is processed based on the generated one or more filtered samples.

* * * * *